(12) United States Patent
Hintz et al.

(10) Patent No.: US 6,803,100 B1
(45) Date of Patent: Oct. 12, 2004

(54) REWETTABLE ADHESIVE SYSTEMS

(75) Inventors: Helmut Hintz, Karben (DE); Ivan Cabrera, Dreieich (DE)

(73) Assignee: Celanese Emulsions GmbH (DE)

( * ) Notice: Subject to any disclaimer, the term of this patent is extended or adjusted under 35 U.S.C. 154(b) by 0 days.

(21) Appl. No.: 09/889,822

(22) PCT Filed: Jan. 11, 2000

(86) PCT No.: PCT/EP00/00146

§ 371 (c)(1),
(2), (4) Date: Jan. 8, 2002

(87) PCT Pub. No.: WO00/43461

PCT Pub. Date: Jul. 27, 2000

(30) Foreign Application Priority Data

Jan. 19, 1999 (DE) .......................................... 199 01 828

(51) Int. Cl.[7] .......................... B32B 7/12; C08L 39/06; C08L 3/00; C08L 29/04
(52) U.S. Cl. .......................... 428/350; 524/47; 524/366; 524/368; 524/503; 524/803; 524/808; 524/831; 156/441.5
(58) Field of Search .......................... 524/47, 366, 368, 524/503, 803, 808, 831; 428/350

(56) References Cited

U.S. PATENT DOCUMENTS

| 3,696,065 A | 10/1972 | Hoffman et al. |
| 5,376,447 A | 12/1994 | Yeung et al. |
| 5,985,299 A | * 11/1999 | Buerger et al. ............. 424/402 |
| 6,025,427 A | 2/2000 | Cabrera |

FOREIGN PATENT DOCUMENTS

| DE | 275 069 | 1/1990 |
| EP | 0 705 896 | 4/1996 |
| EP | 0 894 809 | 2/1999 |

OTHER PUBLICATIONS

Derwent Patent Family Abstract for DD 275 069; Jan. 10, 1990.

* cited by examiner

Primary Examiner—Tae H. Yoon
(74) Attorney, Agent, or Firm—Muserlian, Lucas and Mercanti

(57) ABSTRACT

The invention relates to new rewettable adhesive systems containing colloidal dispersion mixtures obtained by copolymerization of at least one water-soluble monomer with at least one non-water-soluble comonomer in the presence of a micelle-forming emulsifier. The invention also relates to the use of the new adhesive systems.

18 Claims, No Drawings

REWETTABLE ADHESIVE SYSTEMS

The present invention relates to remoistenable adhesive systems comprising novel colloid dispersion mixtures, and to the use thereof.

Remoistenable adhesive coatings, also known as gum, used for postage stamps, envelopes, labels and the like are produced not only using natural products such as starch, dextrin glues and glutine glues but also to a considerable extent using polyvinyl alcohols. These are primarily low molecular mass grades of polyvinyl alcohol, partially hydrolyzed, which are obtained by either acidic or alkaline hydrolysis (DD Patent 62 634). Polyvinyl alcohols have the advantage that under hot conditions solutions having a solids content of up to 45% are possible and can be stored without gelling for a prolonged period when provided with sufficient preservative means. In order to ensure certain blocking resistances in the dried coatings, the polyvinyl alcohol solutions are often blended with homopolymeric polyvinyl acetate dispersions (DD-A-275 069, or EP-A-705 896). Where surface gloss is desired, copolymeric polymer dispersions can also be used. Glycerol or urea is often added in order to improve reemulsifiability. The development of tack after the dried adhesive film has been moistened can be influenced by varying the proportion in which the polyvinyl alcohol and polymer dispersion is blended.

Some of the known gums have considerable disadvantages arising after the dried coating has been stored, especially under hot conditions at 100° C. and for a period of 24 hours.

In many cases, the coating is found to have changed after storage such that it can no longer be activated with water. The coating is then inactive and can no longer be used as a gum. It is an object of the present invention to provide a remoistenable adhesive system which can be stored without change and can be reactivated very readily and within a very short time.

It has surprisingly been found that new kinds of colloid dispersion mixtures, as a constituent in remoistenable adhesive systems, achieve this object.

The present invention therefore provides a remoistenable adhesive system which comprises a colloid dispersion mixture obtained by copolymerizing at least and preference one water-soluble monomer with at least and preferably one water-insoluble comonomer in the presence of a micelle-forming emulsifier.

EP-A-0 894 309 describes colloid dispersion mixtures, processes for preparing them and their use as protective colloids for emulsion polymerization.

The proportion of said at least one water-soluble monomer in the colloid dispersion mixture is preferably from 70 to 95% by weight and with particular preference from 75 to 90% by weight.

Consequently, the proportion of said at least one water-insoluble monomer in the colloid dispersion mixture is preferably from 5 to 30% by weight and with particular preferably from 10 to 25% by weight.

The proportion of the colloid dispersion mixture in the remoistenable adhesive system is from 5 to 100%, preferably from 10 to 100% and, with particular preference, from 20 to 100%; i.e. the colloid dispersion mixture can be used either alone or in the form of a blend with other products without adversely impacting the package of properties of the colloid dispersion.

Suitable blend components include polymer dispersions with different monomer compositions, polyvinyl alcohols, and/or starches.

Relative to remoistenable systems based on dextrin or polyvinyl alcohol, the adhesive system of the present specification features an extremely short reactivation time. This means that the dried film, immediately after it has been wetted, develops a very high wet tack which permits the immediate bonding vital for high-speed automatic sealing units. Sufficiently rapid reactivation is still possible even at very low application rates. At application rates of about 100 $g/m^2$ or more it is found that the rapid development of tack is accompanied by pronounced stringing, which results in optimum substrate wetting.

The adhesives comprising the colloid dispersion are particularly suitable for systems which are reactivated by moistening with water, develop tack and so permit bonding. Examples of the applications include: postage stamps; rear-flap gums for envelopes; remoistenable adhesive tapes; and removable adhesives for the flooring sector.

Removable adhesives are used to bond textile floor coverings since they allow rapid renovation, i.e., replacement of the floor covering. After the floor covering has been taken off, any residues of adhesive remaining on the floor can be removed easily after exposing them to water.

The adhesives can be applied either by roller or with a knotched trowel. Following a short evaporation phase, the textile covering with secondary backing can be laid directly into the still wet adhesive bed.

It has surprisingly been found that, in the presence of an emulsifier which forms micelles, the copolymerization of a water-soluble monomer with a water-insoluble comonomer leads to colloid dispersion mixtures of the copolymer.

Emulsifiers stabilize the finely disperse polymer particles produced by the emulsion polymerization. The emulsifiers are usually surface-active substances, or surfactants. Surfactants have a characteristic structure and possess at least one hydrophilic and one hydrophobic functional group. By virtue of this structure surfactants are able to accumulate at the interface between polymer phase and water phase and by means of steric and/or electrostatic effects to prevent coalescence of finely dispersed polymer particles. If the hydrophilic portion has no electrical charge, the emulsifier is said to be nonionic; if it has a negative charge, it is referred to as an anionic emulsifier; and, if positive charges are present, it is a cationic emulsifier. When surfactants are added to water, above a certain concentration there is formation of spherical micelles. It is this property of surfactants which is of great importance for the implementation of emulsion polymerization. This concentration, called the critical micelle concentration (CMC), is specific to each individual surfactant. If the concentration in water is raised significantly above the CMC, the aggregation behavior of the surfactants is changed, and elongated micelles (rod micelles), for example, are formed.

Suitable emulsifiers for the invention described herein include both nonionic and ionic emulsifiers. Examples of these are alkylaryl polyglycol ethers and alkyl polyglycol ethers each having from 3 to 50 mol of ethylene oxide units, block copolymers of ethylene oxide with propylene oxide, alkylsulfonates or alkylarylsulfonates, alkyl sulfates, alkyl and aryl ether sulfates and phosphates each having preferably 8 to 18 carbon atoms in the lipophilic portion and up to 50 ethylene oxide or propylene oxide units in the hydrophilic portion, and also monoesters or diesters of sulfosuccinic acid, or alkylphenols having in each case preferably 8 to 18 carbon atoms in the alkyl radical.

It is preferred to use nonionic emulsifiers and mixtures of ionic with nonionic emulsifiers.

Water-soluble monomers preferably used are N-methyl-N-vinylacetamide, N-vinylpyrrolidone or N-vinylformamide, as water-insoluble comonomers it is preferred to use unsubstituted or alpha-substituted esters of acrylic acid. Preference is given to the alkyl esters of acrylic or methacrylic acid, especially the $C_4$ to $C_8$ alkyl esters, such as butyl or ethylhexyl esters. It is also possible to use mixtures of the acrylic esters or other monomers, such as esters of maleic acid, for example; preferably dioctyl maleate.

The copolymerization is conducted as a free-radical addition polymerization at temperatures from 15 to 100° C., in particular from 60 to 90° C.; the free-radical initiator used can comprise either water-insoluble compounds such as 2,2'-azobisisobutyronitrile or 2,2'-azobis(2-methylbutyronitrile) or water-soluble compounds such as 2,2'-azobis(2-amidinopropane) dihydro-chloride.

The invention is described in more detail below with reference to working examples, but without being restricted thereby.

Percentages given are always by weight.

EXAMPLE 1

Preparing a Colloid Dispersion Mixture from N-vinylpyrrolidone and 2-ethylhexyl Acrylate 1.6 g of sodium carbonate and 23 g of ®Emulsogen EPN 287 (fatty alcohol polyglycol ether, Clariant GmbH) are dissolved in 497 g of deionized water. The solution is heated to 80° C. At this temperature a mixture of 300 g of vinylpyrrolidone and 100 g of 2-ethylhexyl acrylate is metered in over 180 minutes. In parallel with this, a solution of 2 g of azobisisobutyronitrile in N-vinyl-2-pyrrolidone is metered in. After the end of the metered addition of monomer, the reaction mixture is heated at 80° C. for 90 minutes, then cooled and drained through a 180 µm filter at below 30° C.

The colloid dispersion mixture has the following features:

| Solids content | 30.3% |
|---|---|
| K value | 66 |

Particle size distribution from Mastersizer measurement

| Volume (mass) fractions: | dv(10%) 0.127 µm |
| | dv(50%) 0.418 µm |
| | dv(90%) 1.623 µm |
| N-Vinyl-2-pyrrolidone | 600 ppm |
| 2-Ethylhexyl acrylate | <25 ppm |

EXAMPLE 2

Preparing a Colloid Dispersion Mixture from N-vinylformamide and Dioctyl Maleate 1.6 g of sodium carbonate and 16 g of ®Arkopal N 308 (nonylphenol polyglycol ether with 30 EO, Clariant GmbH) are dissolved in 500 g of deionized water. The solution is heated to 80° C. At this temperature a mixture of 340.6 g of N-vinylformamide and 59.4 g of dioctyl maleate is metered in over 180 minutes. In parallel with this, a solution of 2 g of azobisisobutyronitrile in N-vinylformamide is metered in. After the end of the metered addition of monomer, the reaction mixture is heated at 80° C. for 90 minutes, then cooled and drained through a 180 µm filter at below 30° C.

The colloid dispersion mixture has the following features:

| Solids content | 34% |
|---|---|
| K value | 73.8 |

Particle size distribution from Mastersizer measurement

| Volume (mass) fractions: | dv(10%) 0.322 µm |
| | dv(50%) 0.715 µm |
| | dv(90%) 1.321 µm |
| N-Vinylformamide | <0.1% |
| Dioctyl maleate | 1.4% |

In the text below a number of examples of remoistenable adhesive systems are described, whose testing was carried out as follows:

The remoistenable adhesive to be tested was applied in a wet film thickness of 50µ onto a single-sidedly glazed sodium kraft paper (defined tensile strength 100 g) 5 cm wide and 60 cm long. It was then dried at room temperature. The coated paper strips were subsequently stored under standard climatic conditions (23° C. and 50% relative humidity) for 24 hours.

The setting rate was tested on the Werle Tack Tester by laminating a coated paper with an uncoated paper.

For the test, the settings on the tack tester were as follows:

Open time: 0.5 seconds

Closed time: 0.5 seconds

The coated papers were wetted with a 2% strength solution of ®Tylose MH 1500 K, Clariant GmbH. The application rate is determined by the coater used and is 22 µm wet.

The test result is indicated on a plate which also undergoes the test. Conclusions can be drawn starting from the point where (wet) tack begins to develop, until the paper tears.

EXAMPLE 3

Using the colloid dispersion mixture from Example 1 as a remoistenable adhesive system (proportion of colloid dispersion mixture in the adhesive system: 100%).

Despite a solids content of 30%, the adhesive system exhibits relatively rapid drying. In the drying phase, it features initially a high wet tack and excellent flow and forms coherent, very smooth films which show a high level of blocking resistance. If the absence of water is ensured, coatings on paper, for example, can be stored layer against layer without sticking to one another. This is so not only at room temperature but even at temperatures of 50° C. with an applied load of 200 g/cm$^2$.

EXAMPLE 4

The colloid dispersion mixture of Example 1 is blended 80:20 with a vinyl acetate polymer dispersion (solids content about 50%), e.g., ®Mowilith DH 257 (Clariant GmbH).

EXAMPLE 5

The colloid dispersion mixture of Example 1 is blended 20:80 with a vinyl acetate polymer dispersion (solids content about 50%), e.g., ®Mowilith DH 257 (Clariant GmbH).

EXAMPLE 6

The colloid dispersion mixture of Example 1 is blended 80:20 with a 30% strength solution of a polyvinyl alcohol, e.g., ®Mowiol 4-88 (Clariant GmbH).

For blending, the polyvinyl alcohol is dissolved with stirring in water at 90° C. After the solution has been cooled to room temperature, blending can be carried out in the above proportion.

EXAMPLE 7

The colloid dispersion mixture of Example 1 is blended 20:80 with a 30% strength solution of a polyvinyl alcohol, e.g., ®Mowiol 4-88 (Clariant GmbH).

For blending, the polyvinyl alcohol is dissolved with stirring in water at 90° C. After the solution has been cooled to room temperature, blending can be carried out in the above proportion.

EXAMPLE 8

The colloid dispersion mixture of Example 1 is blended 80:20 with a 6% strength solution of ®Emcol UK/N starch (Emsland).

The starch solution is prepared by scattering into water the starch powder, which is soluble in cold water. In order to avoid the formation of lumps, the starch solution must be prepared with continual stirring. The starch solution must then be protected against infestation by adding preservative.

EXAMPLE 9

The colloid dispersion mixture of Example 1 is blended 20:80 with a 6% strength solution of ®Emcol UK/N starch (Emsland).

The starch solution is prepared by scattering into water the starch powder, which is soluble in cold water. In order to avoid the formation of lumps, the starch solution must be prepared with continual stirring. The starch solution must then be protected against infestation by adding preservative.

The results of testing the remoistenable adhesive systems of Examples 3 to 9 are summarized in Table 1.

TABLE 1

| Example | Open time | Closed time | Application of 50μ wet adhesive film | Commencement of setting seconds | 100 g value after | Remoistenability |
|---|---|---|---|---|---|---|
| 3 | 0.5 s | 0.5 s | No problems | after 3 s | 6 s | very good |
| 4 | 0.5 s | 0.5 s | No problems | after 3.5 s | 7 s | very good |
| 5 | 0.5 s | 0.5 s | No problems | after 5 s | 8 s | satisfactory |
| 6 | 0.5 s | 0.5 s | No problems | after 4 s | 8 s | very good |
| 7 | 0.5 s | 0.5 s | No problems | after 3.5 s | 9 s | very good |
| 8 | 0.5 s | 0.5 s | No problems | after 4.5 s | 8 s | very good |
| 9 | 0.5 s | 0.5 s | No problems | after 10 s | 16 s | good |

What is claimed is:

1. A remoistenable adhesive system which comprises a colloid dispersion mixture obtained by copolymerizing 70 to 95% by weight of at least one water-soluble monomer which is N-vinyl-2-pyrrolidone with at least one water-insoluble comonomer which is an alkyl ester of organic acid or of methacrylic acid or an ester of maleic acid in the presence of micelle-forming emulsifier.

2. The remoistenable adhesive system as claimed in claim 1, wherein the proportion of the colloid dispersion mixture in the adhesive system is from 5 to 100%.

3. The remoistenable adhesive system as claimed in claim 1, which further comprises polymer dispersions of different monomer compositions, polyvinyl alcohol, and/or starch.

4. The remoistenable adhesive system as claimed in claim 1, wherein said water-insoluble comonomer is butyl or ethylhexyl acrylate or dioctyl maleate.

5. The remoistenable adhesive system as claimed in claim 1, wherein said emulsifier comprises nonionic emulsifiers or mixtures of ionic with nonionic emulsifiers.

6. The remoistenable adhesive system as claimed in claim 1, wherein said emulsifier comprises alkylaryl polyglycol ethers or alkyl polyglycol ethers each having from 3 to 50 mol of ethylene units, block copolymers of ethylene oxide with propylene oxide, alkylsulfonates or alkylarylsulfonates, alkyl sulfates, alkyl and aryl ether sulfates and phosphates each having 8 to 18 carbon atoms in the lipophilic portion and up to 50 ethylene oxide or propylene oxide units in the hydrophilic portion, and also monoesters or diesters of sulfosuccinic acid, or alkylphenols having in each case 8 to 18 carbon atoms in the alkyl radical.

7. The remoistenable adhesive system as claimed in claim 1, wherein the copolymerization is conducted as a free-radical polymerization.

8. The remoistenable adhesive system as claimed in claim 7, wherein the copolymerization is conducted at from 60 to 90° C.

9. In postage stamps, rear-flap gums for envelopes, adhesive binders and adhesives for the flooring sector, the improvement comprising using as the removable adhesive a remoistenable adhesive system which comprises a colloid dispersion mixture obtained by copolymerizing 70 to 95% by weight of at least one water-soluble monomer with at least one water insoluble comonomer which is an unsubstituted or alpha-substituted ester of acrylic acid, an unsubstituted or alpha-substituted ester of methacrylic acid or an ester of maleic acid, in the presence of a micelle-forming emulsifier.

10. The postage stamp, rear-flap gum for envelopes, adhesive binder and adhesive for the flooring sector as claimed in claim 9, wherein the proportion of the colloid dispersion mixture in the adhesive system is from 5 to 100%.

11. The postage stamp, rear-flap gum for envelopes, adhesive binder and adhesive for the flooring sector as claimed in claim 9 wherein the remoistenable adhesive system further comprises polymer dispersions of different monomer compositions, polyvinyl alcohol, and/or starch.

12. The postage stamp, rear-flap gum for envelopes, adhesive binder and adhesive for the flooring sector as claimed in claim 9, wherein said water-soluble monomer is N-methyl-N-vinylacetamide, N-vinyl-2-pyrrolidone or N-vinylformamide.

13. The postage stamp, rear-flap gum for envelopes, adhesive binder and adhesive for the flooring sector as claimed in claim 9, wherein said water-soluble monomer is N-vinyl-2-pyrrolidone and said water-soluble comonomer is an alkyl ester of acrylic or methacrylic acid.

14. The postage stamp, rear-flap gum for envelopes, adhesive binder and adhesive for the flooring sector as claimed in claim 9, wherein said water-soluble comonomer is butyl or ethylhexyl acrylate or dioctyl maleate.

15. The postage stamp, rear-flap gum for envelopes, adhesive binder and adhesive for the flooring sector as claimed in claim 9, wherein said emulsifier comprises nonionic emulsifiers or mixtures of ionic with nonionic emulsifiers.

16. The postage stamp, rear-flap gum for envelopes, adhesive binder and adhesive for the flooring sector as claimed in claim 9, wherein said emulsifier comprises alkylaryl polyglycol ethers or alkyl polyglycol ethers each having from 3 to 50 mol of ethylene units, block copolymers of ethylene oxide with propylene oxide, alkylsulfonates or alkylarylsulfonates, alkylsulfates, alkyl and aryl ether sulfates and phosphates each having 8 to 18 carbon atoms in the lipophilic portion and up to 50 ethylene oxide or poropylene oxide units in the hydrophilic portion, and also monoesters or diesters of sulfosuccinic acid, or alkylphenols having in each case 8 to 18 carbon atoms in the alkyl radical.

17. The postage stamp, rear-flap gum for envelopes, adhesive binder and adhesive for the flooring sector as claimed in claim 9, wherein the copolymerization is conducted as a free-radical polymerization.

18. The postage stamp, rear-flap gum for envelopes, adhesive binder and adhesive for the flooring sector as claimed in claim 9, wherein copolymerization is conducted at from 60° to 90° C.

* * * * *